INVENTOR.
R. E. HARRINGTON
ATTORNEYS

June 24, 1958   R. E. HARRINGTON   2,840,140
SEAT

Filed April 1, 1954   3 Sheets-Sheet 2

INVENTOR.
R. E. HARRINGTON

ATTORNEYS

June 24, 1958 R. E. HARRINGTON 2,840,140
SEAT
Filed April 1, 1954 3 Sheets-Sheet 3

INVENTOR.
R. E. HARRINGTON

ATTORNEYS

United States Patent Office 2,840,140
   Patented June 24, 1958

2,840,140

SEAT

Roy E. Harrington, Moline, Ill., assignor to Deere & Company, Moline, Ill., a corporation of Illinois Application April 1, 1954, Serial No. 420,283

11 Claims. (Cl. 155—51)

This invention relates to a seat and more particularly to an improved seat suspension for mounting a seat on a vehicle such as an agricultural tractor.

As will be appreciated by those skilled in the art, the problems of comfort and improved riding qualities are more acute in a vehicle seat than in a static seat and that these problems are even more important in the agricultural field because of the uneven terrain over which agricultural vehicles are compelled to operate. In the general art referred to, it is not unknown to utilize a parallel link suspension supported at least in part by a combined spring and shock-absorbing means. Most seats will include provision for some kind of adjustment in order that the seat may accommodate riders of different weights, heights and other physical characteristics. One of the factors that may be varied in a seat according to the weight of the rider or operator is the pre-load of the spring in the suspension means, it being not uncommon to increase the pre-load of the spring for heavier riders. Normally, this will produce constant load rates of the suspension for all weights of operators but the natural frequency of the suspension will decrease with an increase in the weight of the operator. Another form of adjustment that is resorted to is that affecting the moment arm of the lever acting on the spring. Here again, the increase in length is in direct proportion to the increase in weight of the operator or rider. With a constant pre-load on the spring and the moment arm adjusted to give the correct static loaded position of the seat, the natural frequency of the suspension will increase with the increase in the weight of the rider.

According to the present invention, the advantages of both types of adjustment are advantageously employed, and the adjustment of the two factors just mentioned is accomplished in a preferred form of the invention by a single adjusting member. The primary benefit obtained from the combination of the two adjustments is the obtaining of the best and same combination of natural frequency and total movement for any operator, regardless of his weight. Without some form of adjustment, a seat suspension designed for the optimum ride for the average operator is inadequate for the light or the heavy rider. In the design of the average suspension, the designer selects a spring that is suitable for a rider of average weight, which gives the seat a static loaded position midway between the upper and lower limits on its vertical travel. In such suspension, the light rider sits nearer the upper limit of vertical travel, because he does not have the necessary weight to depress the seat to the mid-position and consequently "tops" too frequently. The heavier rider depresses the seat past the mid-position and therefore "bottoms" more often than is desirable. If the suspension is modified to provide for varying the pre-load on the spring, the respective static loaded positions of light and heavy riders will be correct but the ride qualities are no better than without adjustment, because the spring rate is the same. If the pre-load on the spring is constant and the moment arm made variable, so that the correct static loaded position may be obtained for the particular rider, then the light and heavy riders respectively obtain excessively soft and stiff rides, because the moment arms acting on the spring are respectively too short and too long. The combination of the two adjustments produces an optimum ride for average, light and heavy riders alike, because the light rider obtains simultaneously a lighter pre-load and a longer moment arm, and a heavier pre-load and a shorter moment arm are simultaneously available to the heavy rider.

It is an important feature of the invention to utilize to as great and extent as possible proven characteristics of seat suspensions and to incorporate therein the improved combination adjustment according to the present invention. A further object of the invention is to utilize resilient stop means for establishing limits on the seat so that cushions are afforded for the seat when it tops as well as when it bottoms. On the whole, the preferred embodiments of the invention disclosed herein are based on a design that produces a seat especially useful on an agricultural tractor.

The foregoing and other important objects and desirable features inherent in and encompassed by the invention will become apparent as a prefered embodiment of the invention, together with a modification thereof, is disclosed in detail in the following specification and accompanying sheets of drawings, the several figures of which will be described immediately below.

Figure 1:
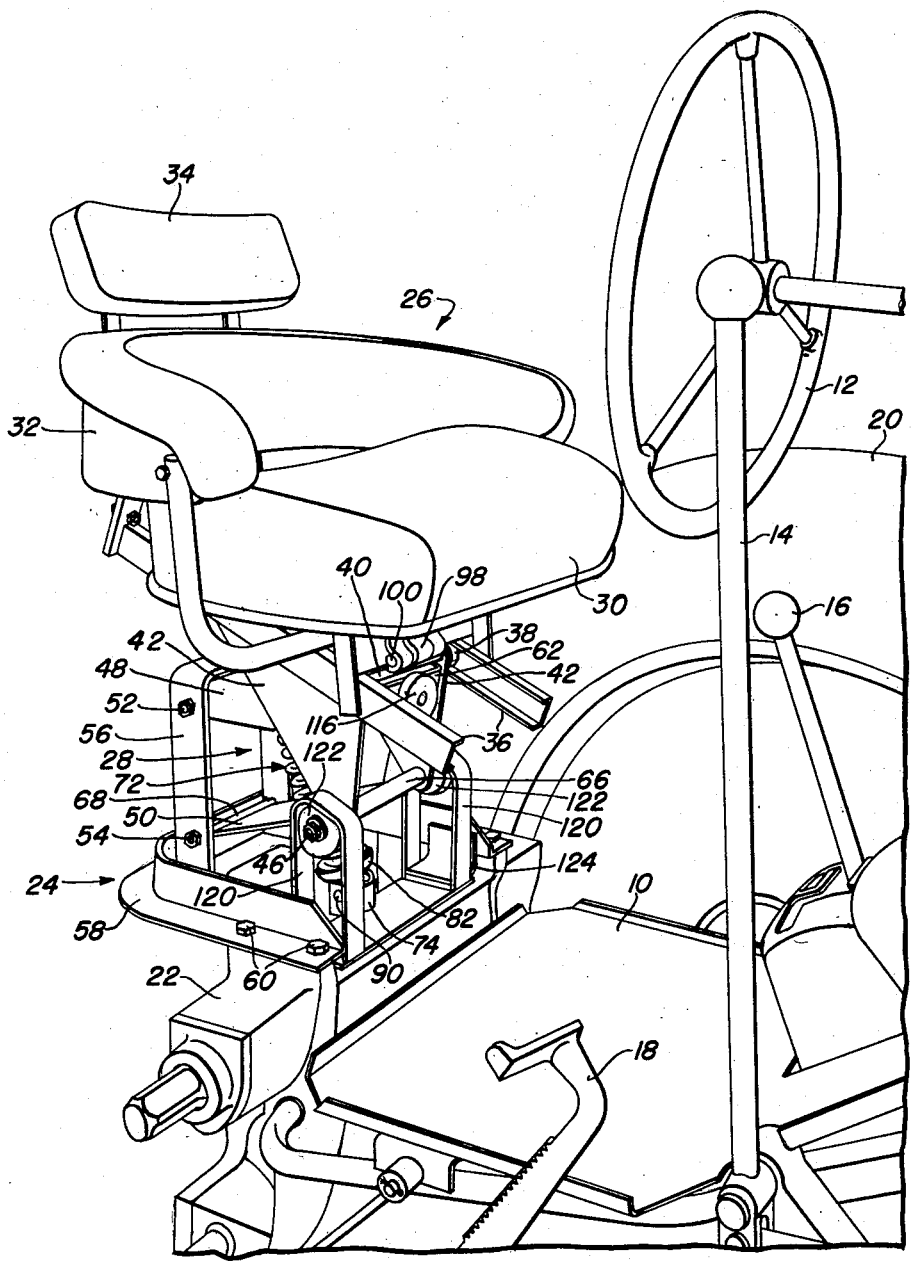
Fig. 1 is a perspective view of a rear portion of a typical agricultural tractor embodying one form of the improved seat suspension.

In Fig. 1, the numeral 10 designates generally the rear body portion of a tractor of a type familiar in the agricultural field, such as a tractor of the type shown in the U. S. patent to McCormick, 2,304,365. The details of the tractor do not of course form any specific part of the invention and are shown for purposes of orienting the seat relative to the vehicle.

Also appearing in Fig. 1 as familiar components of a tractor of the type referred to are a steering wheel 12, a clutch-operating lever 14, a gear shift lever 16 and a brake pedal 18, all of which are conveniently grouped together to provide an operator's station on which the improved seat is mounted. The tractor includes, of course, right- and left-hand traction wheels, only the left-hand one of which appears at 20, and the main tractor body includes rear supporting structure in the form of a housing 22 on which is rigidly affixed a seat support, designated in its entirety by the numeral 24. A seat 26 is mounted on the support or supporting structure 24 by means of a suspension or supporting linkage 28, this linkage being so designed as to give the seat 26 substantially vertical rather than arcuate movement as loads on the seat vary during operation.

Figure 5:
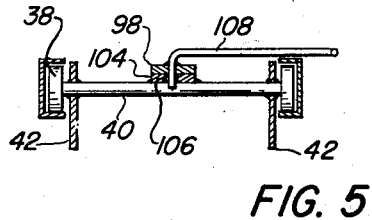
Fig. 5 is an enlarged sectional view as seen along the line 5—5 of Fig. 2.

The seat 26 is of somewhat unconventional construction but the details of that construction are not material here. For present purposes, it is deemed sufficient to picture the seat as having a seat cushion 30 embraced at its rear and sides by a combination arm and lower back rest 32 above the intermediate rearward portion of which rises an upper central back rest 34. The bottom of the seat is rigidly affixed by transverse angles 33 to a pair of longitudinally and rearwardly uphill extending channels 36, these channels facing inwardly or toward each other to provide a pair of tracks or guides for receiving a plurality of rollers 38 (best shown in Fig. 5). There are two pairs of such rollers, spaced apart in a fore-and-aft direction, and each pair of rollers is carried on a cross shaft 40 that forms part of the suspension linkage 28.

Specifically, the roller shafts 40 are rigidly affixed to the upper portions of a pair of transversely spaced apart, generally triangular plates 42. These plates are pivotally connected by a pair of transverse vertically spaced cross shafts 44 and 46 respectively to a pair of upper links 48 and a single lower link 50. For all practical purposes, the pair of upper links 48 may be considered a single link or lever and will hereinafter sometimes be referred to in the singular. The upper and lower links 48 and 50 are substantially parallel and are respectively pivoted at their rear ends via cross shafts 52 and 54 to an upright part 56 of the supporting structure 24. The lower portion of the upright 56 is rigidly secured to a forwardly facing U-shaped frame member 58 which is in turn rigidly mounted, as by cap screws 60, to the tractor housing portion 22.

In its broad aspects, the interconnected structure comprising the upright support part 56, the upper and lower links 48 and 50, the plates 42, and the pivots at 44, 46, 52 and 54 comprises a representative type of the familiar parallel linkage heretofore used generally in seat suspensions to achieve vertical rather than arcuate movement as the load on the seat varies during operation. However, certain of the details are significant, since they lend themselves to the over-all design. For example, the upper link 48 is in the form of a U-shaped member or bail, the legs of which form the lever between the pivotal connections 52 and 44 and the transverse portion or bight 62 of which constitutes a transverse supporting or mounting member, for purposes to presently appear. Rear end portions of the U-shaped structure are rigidly cross-connected by a rear transverse member 64. Further, the lower link 50 has substantial width as well as length between the lower pivots 46 and 54, this being achieved by the formation of the link 50 as a plate having front and rear tubular end portions 66 and 68 that form journals respectively for the front and rear pivot shafts 46 and 54. The plate-like link 50 has intermediate its ends a circular aperture 70 for the purpose of accommodating biasing means, designated in its entirety by the numeral 72, connected between an anchor or mount 74 on the support structure 24 and the upper link 48.

As is generally conventional, the biasing means or unit 72 comprises a combined coil spring 76 and a coaxially or concentrically arranged shock absorber 78, which has upper and lower coaxially telescopic parts terminating respectively in end caps 80 and 82 which respectively receive and abut opposite end portions of the spring 76, as in the U. S. patent to Parisi, 1,737,328, except that in the present case the spring is exposed. The upper cap 80 includes an eye 84 through which is passed a cross shaft or pin 86 for establishing a pivotal connection of the unit 72 to the upper link 48, the details of which will be described below. The lower cap 82 has a similar eye 88 for receiving a cross shaft or pin 90 that establishes a pivotal connection between the unit 72 and the anchor or mount 74.

The upper connecting shaft or pin 86 for the spring and shock-absorbing unit 72 passes through axially alined apertured legs 92 of a second bail 94 and thence through transversely alined guide or supporting means in the form of slots 96 in the opposite legs of the upper link 48.

This structure, plus additional means to be presently described, comprises adjustable means for mounting the upper end of the unit 72 on the suspension linkage 28 via the upper link or lever 48. The lower end of the unit 72 is, as has already been described, fixed but pivotally mounted at 74—90 on the supporting structure 24. Assuming for the moment that the connection of the unit 72 at 86 to the upper link 48 is not adjustable, it will be seen that vertical movement of the seat 26 is opposed, at least in a downward direction, by the spring 76 and that return or upward movement of the seat is cushioned by the shock absorber 78. To this extent, the present structure is broadly not unconventional. The seat 26, previously described as being mounted on the triangular plates 42 by means of the rollers 38 and cross shafts 40, is adjustable fore and aft between any one of a plurality of selectively fixed positions by means of a latch plate 98 pivoted at its forward end on a transverse axis at 100 to a bracket 102 included in the front seat-support angle 33 that has been previously described as fixing the seat to the guide channels 36. A longitudinal fixed plate 104 is secured, as by welding, at its opposite ends to the transverse roller shafts 40 and has therein a plurality of fore-and-aft spaced apart apertures, as at 106 (Fig. 5), into any one of which the depending end of a latch pin 108 may be dropped. The latch pin 108 is rigidly affixed as by welding to the pivoted latch plate 98 so that the latch plate may, at the will of the operator, be raised to release the latch pin from an aperture 106 to enable the seat to be adjusted fore and aft until the adjusted position thereof suits the operator, after which the latch plate may be released so hat the weight thereof causes the depending end of the pin 108 to engage another aperture 106.

The adjustable means for the upper end of the unit 72, previously described as including the bail 94, enables fore-and-aft adjustment of the unit, which adjustment is accommodated by the longitudinal or fore-and-aft extending slots 96 in the opposite legs of the upper link 48. The adjustable connection between the bail 94 and the upper link 48 is accomplished by means of an operating screw 110 threaded through a tapped bore 112 in the front cross portion of the bail 94 and journaled at 114 in the front crossbar 62 of the upper link 48. The forward end of the screw 110 has thereon an operating handle 116 that is conveniently located just below the forward portion of the seat cushion 30. A pin 118 confines the screw 110 against axial displacement relative to the crossbar 62 of the upper link 48 and serves to establish an anchor against which the screw reacts as it is rotated to propel the adjusting bail 94 selectively in either forward or rearward directions, carrying with it the upper end of the unit 72, and the opposite projecting ends of the connecting cross pivot shaft 86 ride in the guides established by the slots 96 in the upper link 48.

Figure 2:
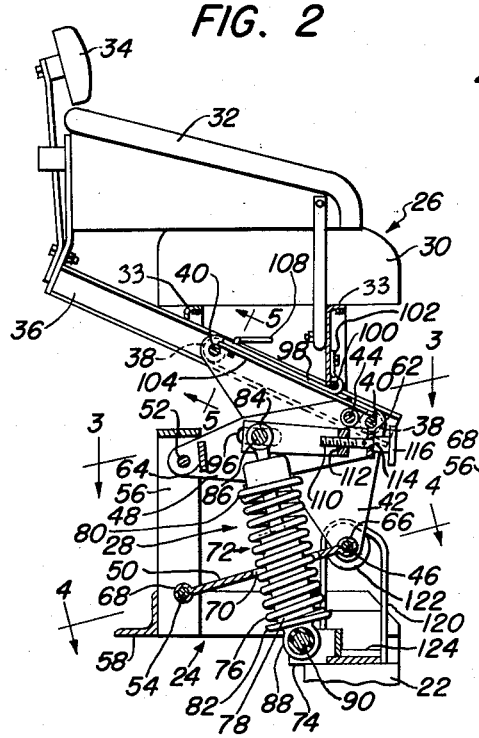
Fig. 2 is a longitudinal sectional view of the seat structure shown in Fig. 1.
Figure 4:
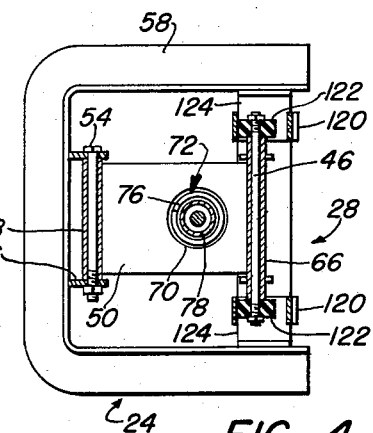
Fig. 4 is a sectional view, on the scale of Fig. 2, as seen along the line 4—4 of Fig. 2.
Figure 3:
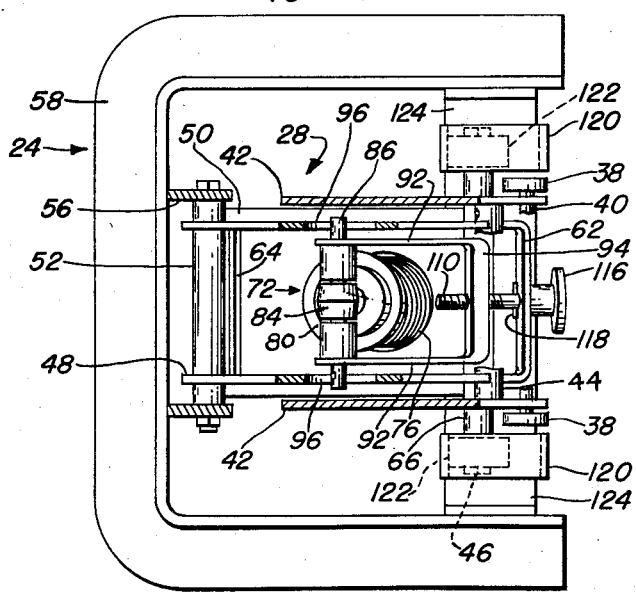
Fig. 3 is a sectional view, on an enlarged scale, as seen along the line 3—3 of Fig. 2.

The spring 76, as previously described, is constantly urging the seat 26 in an upward direction, but, according to the present invention, stop means is provided for establishing an upper or top limit of movement of the seat. This stop means comprises a pair of transversely spaced apart and upwardly extending members in the form of loops 120 within each of which operates a second stop member in the form of a yieldable stop member or circular rubber cushion 122. These cushions are carried at opposite projecting ends of the lower front parallel-link pivot shaft 46 (Fig. 4). The upper portion of each loop is shaped, as shown in Fig. 2, to confine and temporarily compress the associated cushion 122 when the seat tops or reaches its upward limit. The cushions 122 also establish downward limits on the seat so that when the seat bottoms it is substantially without shock as the cushions 122 engage bottom stops or bumpers 124 respectively at the lower ends of the loops 120.

From the description thus far, it will be seen that the seat 26 is movable vertically on the support 24 by means of the suspension linkage 28, the vertical movement being controlled by the spring and shock-absorber unit 72. Moreover, upper and lower limits are established by the stop means 120—122 and these limits are attained as the seat tops and bottoms. Shock is minimized because of the cushioning effect of the rubber bumpers 122. Assuming that no adjustment is made at the connection 86 of the upper end of the unit 72 to the upper link 48, the lever arm or moment arm acting on the spring 76 is the distance between the cross shaft 86 and the rear upper pivot 52 for the link 48. With a given moment arm and a spring of known characteristics, a certain result will be obtained. Of course, if all operators were of the same weight, the problem could be solved by initial selection of the proper spring and the proper moment arm. But, because uniformity among weights of riders is virtually impossible to achieve except by unjustifiable classification of personnel, it becomes necessary, as pointed out generally above, to provide some form of adjustment so that the seat will accommodate itself to as large a group of riders as possible. For the purposes of the present case, the only really important factor is the weight of the operator. It is known, of course, that a heavier operator should have a stiffer or heavier spring or, keeping the spring constant, he should have a seat in which the lever or moment arm acting on the spring is longer. As outlined previously, these independent solutions have been attempted but the results leave much to be desired. However, by means of the structure described above as comprising that form of the invention shown in Figs. 1 through 5, a composite of the two formerly independent adjustments is utilized to achieve beneficial results heretofore unknown.

As already described, the spring 76 constantly urges the seat upwardly; that is, it resists downward deflection of the seat. In the present case, the seat is stopped at 120—122 and there is a predetermined pre-load in the spring. The spring, like all springs, can be varied as to pre-load by changing the initial height or length thereof. This is accomplished in the present case by changing the triangular relationship of the axis of the spring to the points 52 and 86, it being seen that the points 52, 86 and 90 respectively establish the apices of a triangle, one side of the triangle being the moment arm between 52 and 86, another side being the axis of the unit 72 and the third side being an imaginary line between 52 and 90.

The slots 96 are straight and moreover are at an obtuse angle to the axis of the spring. Stated otherwise, the slots are not arcuate about the point 90 as a center. If they were so arcuate, then adjustment of the point 86 along such arc would not have any effect on the height of the spring and therefore would not cause any change in the pre-load of the spring. However, since the slots 96 are not arcuate and are arranged as described, or in an equivalent manner, adjustment of the point 86 along the length of the slots 96 varies the distance between the points 84 and 90 and consequently varies the height and the pre-load of the spring 76. At this point, it should be noted that reference is had to terms characteristic of a compression spring, because a compression spring is most easily adapted to a suspension of the character disclosed; however, it will be obvious that other types of springs or biasing means could be used with no dissimilar results.

Another reason why the height and consequently the preloading of the spring 76 is varied when adjustment of the point 86 is effected along the slots 96 is that the stop means 120—122 establishes an upper limit beyond which the suspension linkage 28 and seat 26 cannot move. Without such stop means, adjustment of the point or shaft 86 as described would merely elevate the seat and would therefore allow the spring to increase in length, resulting in a decrease in the preload. What is more desirable is accomplished by the construction illustrated, wherein an initial predetermined minimum pre-load is built into the spring and the adjustment accomplishes selective incremental increase in the pre-load.

In addition to the foregoing, adjustment of the point 86 along the slots 96 varies the distance between that point and the pivot point 52. Consequently, the moment arm as previously described as existing between these two points is varied. It is important that the length of the moment arm be increased in direct proportion to an increase in pre-load on the spring. That is to say, the greater the pre-load the greater the moment arm. If the opposite result were achieved, the ride furnished by the seat would be undesirably light because of a short moment arm and a high pre-load in the spring or would be excessively stiff with a long moment arm and a relatively lesser pre-load in the spring. Of course, an optimum ride for a particular weight of operator could be obtained between the two extremes assumed, but the adjustments or variations for lighter and heavier operators would give results that are just the reverse of what is desired.

The structure described produces the proper adjustment not only of pre-load in the spring but of the moment arm as well and accomplishes these adjustments simultaneously. These, as already outlined, comprise two of the most important features of the invention. Other features reside in the specific arrangement of the linkage and the relationship of the unit 72 thereto, the structure of the lower link 50 being, as previously described, a plate having an aperture therein through which the unit 72 extends, whereby a substantially compact structure results.

Figure 6:
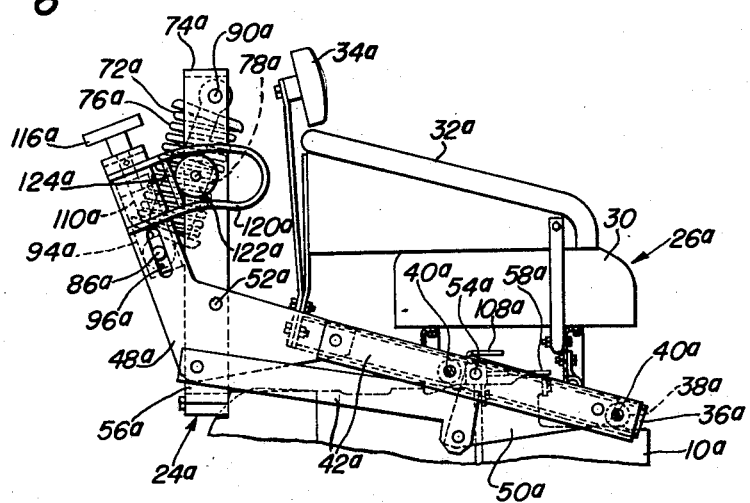
Fig. 6 is a side elevational view of a modified form of suspension for the seat shown in Fig. 1.
Figure 7:
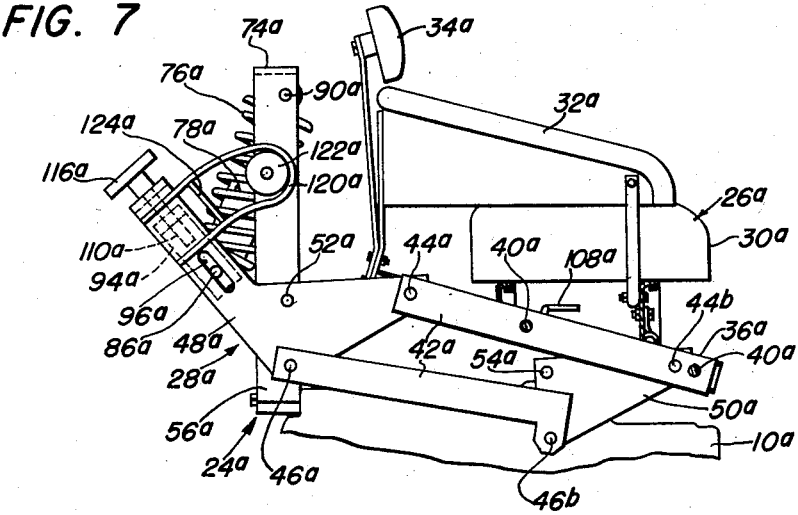
Fig. 7 is a similar view, showing the seat of Fig. 6 in a different position.

The same advantages accrue in the modified form of construction shown in Figs. 6 and 7. For the purposes of the present disclosure and to the extent possible, the structural characteristics of the modified form will be described in terms of the description of that form of the invention shown in Figs. 1 through 5, the exponent "a" being used to distinguish and at the same time to relate corresponding parts.

In Figs. 6 and 7, the numeral 10a designates the rear portion of a tractor on which a seat support 24a is carried for mounting a seat 26a by means of suspension linkage 28a. The seat 26a, like the seat 26, comprises a cushion 30a, an arm rest 32a and a back rest 34a, and is mounted for fore-and-aft adjustment by means including channels 36a within which ride rollers 38a. The rollers are mounted on roller shafts 40a, and fore-and-aft adjustment of the seat is accomplished by latch means similar to that previously described, the numeral 108a being applied in Figs. 6 and 7 to orient the location of the latch means.

Instead of triangular plates like those previously described at 42, the seat 26a is mounted on front and rear links or levers 48a and 50a by means of upper and lower bars 42a, a variation that is required because of structural peculiarities of a tractor that is somewhat different from that shown in Fig. 1. The supporting structure 24a includes an upright part 56a to which the lever 48a is pivoted by means of a cross shaft 52a. The front lever 50a is pivoted directly to the tractor or to some intermediate support, such as that at 58a, a pivotal connection being established at 54a.

The upper of the two links 42a is pivotally connected at its rear end at 44a to the front arm of the rear lever 48a and is pivotally connected at its front end at 44b to the front lever 50a. The lower of the links 42a is pivotally connected at its front and rear ends respectively to the levers 48a and 50a by means of pivots 46a and 46b. The parallel linkage thus provided affords vertical movement of the seat 26a in a manner very similar to that afforded by the parallel linkage 28 in Figs. 1 through 5.

Movement of the seat 26a as described is controlled by means of a combined spring and shock absorber unit 72a, which is pivotally anchored at 90a at its upper end to an upper supporting portion 74a of the upright part 56a of the supporting structure 24a. The other end of the unit includes a transverse shaft 86a that is adjustably movable along a slot 96a in the rear arm of the bell crank 48a, adjustment being accomplished by a bail 94a and an adjusting screw 110a identical to those parts previously described in connection with Figs. 1 through 5. The unit 72a includes a spring 76a and a shock absorber 78a.

In this form of the invention a stop loop 120a is carried by the lever or arm 48a rather than by the support 24a and a rubber ring or cushion 122a is carried by the support 24a, but this is a mere reversal of parts as respects the structure of Figs. 1 through 5 and there are no material differences in operation. Either form could be used in either of the modified designs of the basic invention.

It will be observed that the same basic relationship of the unit 72a to the pivots 52a, 90a and 86a exists as existed in the case of Figs. 1 through 5. The effective moment arm acting on the spring 76a is between the points 52a and 86a and the relationship of the slot 96a to the axis of the spring is such that adjustment of the bail 94a by the screw 110a accomplishes simultaneous increase of spring pre-load and increase of moment arm or simultaneous decrease of both the pre-load and the moment arm, all characteristics similar to those previously described and hence requiring no elaboration. The stop means 120a—122a establishes stops for top and bottom limits of the seat 26a and a bumper 124a is engageable with the rubber cushion 122a to establish a bottom limit.

Fig. 7 shows the seat in its unloaded position, whatever initial pre-load that is built in the spring being effective to maintain engagement of the stop means 120a—122a. Fig. 6 shows the seat fully deflected so that the rubber cushion or ring 122a is engaging the bottoming stop or bumper 124a. Since the operation of the structure shown in Figs. 6 and 7 very closely parallels that of Figs. 1 through 5 and is identical in results achieved, it is deemed unnecessary to resort to a separate description. The features attainable in the structure of Figs. 6 and 7 are in most respects equal to those flowing from the design of Figs. 1 through 5.

Various important objects and features not specifically enumerated herein will undoubtedly occur to those conversant with the art to which the present invention relates, all of which, as well as further modifications of the preferred embodiments of the invention disclosed here, may be achieved without departure from the spirit and scope of the invention.

What is claimed is:

1. A seat suspension of the character described, comprising: a support; a seat proximate to the support; means mounting the seat on and for vertical movement relative to the support between upper and lower positions, said means including a U-shaped member having a transverse bight and a pair of spaced apart legs, said legs having coterminous free ends pivoted to the support on a common transverse axis, and means carrying the seat on said U-shaped member for movement of the seat and member in unison; stop means cooperative between the seat and the support and engageable to establish a limit for the upper position of the seat and U-shaped member relative to the support; a pair of elongated guide means, one on and lengthwise of each leg of the U-shaped member; a cross member carried at opposite ends in the guide means; adjusting means movably carried by the bight of the U-shaped member and connected to the cross member for moving said cross member selectively toward and away from the aforesaid pivot axis of the U-shaped member to the support for varying the moment arm between said axis and the cross member; and biasing means normally urging the seat to its limited upper position as established by the engaged stop means, said biasing means including a variable-load spring having a connection at one end to the cross member and further having a connection at its other end to the support, the configuration of the guide means and its disposition with respect to the connection of the spring to the support being such that adjustment of the cross member to vary the moment arm simultaneously varies the load on the spring with the seat in its limited upward position.

2. The invention defined in claim 1, in which: the adjusting means for the cross member comprises a bail having a bight proximate to the bight of the U-shaped member and a pair of legs respectively alongside the legs of said U-shaped member and carrying the cross member, and an adjusting element cooperative between the two bights to move the bail and consequently the cross member selectively toward and away from the pivot axis of the U-shaped member to the support.

3. The invention defined in claim 1, in which: the spring is a coiled compression spring having its axis at such angle to the guide means that adjustment of the cross member in one direction simultaneously increases the moment arm and decreases the height of the spring with the seat in its limited upper position.

4. A seat suspension of the character described, comprising: a support; a seat proximate to the support; means mounting the seat on and for vertical movement relative to the support between upper and lower positions, said means including a U-shaped member having a transverse bight and a pair of spaced apart legs, said legs having coterminous free ends pivoted to the support on a common transverse axis, and means carrying the seat on said U-shaped member for movement of the seat and member in unison; a pair of elongated guide means, one on and lengthwise of each leg of the U-shaped member; a cross member carried at opposite ends in the guide means; adjusting means movably carried by the bight of the U-shaped member and connected to the cross member for moving said cross member selectively toward and away from the aforesaid pivot axis of the U-shaped member to the support for varying the moment arm between said axis and the cross member; and biasing means normally urging the seat upwardly, said biasing means having first and second spaced apart connections respectively to the cross member and to the support.

5. The invention defined in claim 4, in which: the adjusting means for the cross member comprises a bail having a bight proximate to the bight of the U-shaped member and a pair of legs respectively alongside the legs of said U-shaped member and carrying the cross member, and an adjusting element cooperative between the two bights to move the bail and consequently the cross member selectively toward and away from the pivot axis of the U-shaped member to the support.

6. A seat suspension, comprising: a support; a seat proximate to the support; upper and lower substantially parallel links having pivotal connections at their opposite ends on transverse axes respectively to the support and to the seat to afford vertical movement of the seat relative to the support, said lower link comprising a plate-like member of substantial width transverse to the path of movement of the seat and having an aperture therethrough; and a biasing and control unit disposed in a generally upright position and extending through said aperture, said unit having an upper end connected to the upper link and a lower end connected to the support below said lower link.

7. The invention defined in claim 6, in which: the seat has a pair of transversely spaced members depending therefrom and having transversely alined apertured lower ends proximate to one end of the lower link, and the pivotal connection of the lower link to the seat is via said members, the end of said lower link proximate to said members having thereon a transverse tubular element and a pivot shaft passed through said element and the apertured lower ends of said members.

8. A seat suspension of the character described, comprising: a support; a seat proximate to the support; substantially parallel link means pivoted to the support and to the seat and carrying the seat for up and down movement relative to the seat; energy-storing biasing means acting on the seat and reacting on the support to resiliently urge the seat upwardly; and stop means cooperative between the link means and the support to establish an upper limit on upward movement of the seat, said stop means comprising a loop carried by the support and elongated in the direction of movement of the link means, and a resilient bumper carried by the link means and running in the loop, said bumper being engageable with the closed end of the loop to establish the limit aforesaid.

9. A seat suspension of the character described, comprising: a support; a seat proximate to the support; means mounting the seat on and for vertical movement relative to the support between upper and lower positions, said means including a leg member having a portion transverse thereto adjacent to one end thereof and having its other end pivoted to the support on a transverse axis, and means carrying the seat on said member for movement of the two in unison; elongated guide means disposed lengthwise of said member; a cross member movable in the guide means; adjusting means movably carried by the aforesaid transverse portion of the leg member and connected to the cross member for moving said cross member selectively toward and away from the aforesaid pivot axis of the leg member to the support for varying the moment arm between said axis and the cross member; and biasing means normally urging the seat upwardly, said biasing means having first and second spaced apart connections respectively to the cross member and to the support.

10. A seat suspension of the character described, comprising: a support element; a seat element proximate to the support element; means including upper and lower generally parallel links having transverse pivotal connections to the elements and mounting the seat element on and for substantially translatory vertical movement relative to the support element; a connecting member; means supporting the connecting member on and for selective adjustment infinitely within limits along one of the links toward and away from the pivotal connection of said one link to one element to achieve any one of several moment arms as measured by the distance between the said pivotal connection and the adjusted connecting member; one-way stop means operative to establish a limit on upward movement of the seat element relative to the support element; and biasing means yieldingly resisting downward movement of the seat element and preloaded to normally urge the seat element to its limited upward position as established by the engaged stop means, said biasing means including a spring having a first anchor at one end to the connecting member and a second anchor at its other end to one of the elements in spaced relation to the aforesaid pivotal connection, said supporting means for the connecting member defining such path of movement for the connecting member that adjustment of the connecting member, while the seat element is in its upper limited position, simultaneously varies the preload on the spring in direct proportion to the length of the aforesaid moment arm.

11. A seat suspension of the character described, comprising: a support element; a seat element proximate to the support element; means mounting the seat element on the support element for vertical movement of the former relative to the latter, said means including a generally U-shaped member having a cross portion and a pair of transversely spaced legs joined to said cross portion and extending to coterminous free ends pivoted to the support element on a common transverse pivot axis, and means connecting the seat element to said U-shaped member for movement of said seat element and member in unison; a cross member disposed transversely between the legs; means supporting the cross member on the legs for movement of said cross member relative to and lengthwise of the legs for adjustment selectively toward and away from the aforesaid pivot axis; adjusting means connected between the cross member and the cross portion of the U-shaped member for adjusting the cross member lengthwise of the legs for varying the moment arm between said pivot axis and the cross member; and biasing means normally urging the seat upwardly, said biasing means having first and second spaced apart connections respectively to the cross member and to one of said elements.

References Cited in the file of this patent

UNITED STATES PATENTS

| | | |
|---|---|---|
| 2,289,854 | Permann | July 14, 1942 |
| 2,503,796 | Bruhn | Apr. 11, 1950 |
| 2,558,049 | Hersey | June 26, 1951 |
| 2,574,057 | Peterson | Nov. 6, 1951 |
| 2,591,144 | Fleischer | Apr. 1, 1952 |
| 2,667,209 | Gundersen | Jan. 26, 1954 |